2 Sheets—Sheet 1.

D. C. WILLIAMS.
Apparatus for Obtaining and Washing Sand.

No. 206,514.      Patented July 30, 1878.

Witnesses
J. J. Johnston
Alex. S. N. Johnston

Inventor
David C. Williams

2 Sheets—Sheet 2.

D. C. WILLIAMS.
Apparatus for Obtaining and Washing Sand.

No. 206,514.  Patented July 30, 1878.

Witnesses
J. J. Johnston
Alex. H. Johnston

Inventor
David C. Williams

UNITED STATES PATENT OFFICE.

DAVID C. WILLIAMS, OF NEWARK, OHIO.

IMPROVEMENT IN APPARATUS FOR OBTAINING AND WASHING SAND.

Specification forming part of Letters Patent No. 206,514, dated July 30, 1878; application filed June 6, 1878.

*To all whom it may concern:*

Be it known that I, DAVID C. WILLIAMS, of Newark, in the county of Licking and State of Ohio, have invented a new and useful Improvement in Sand-Washing Boats; and I do hereby declare that the following is a full, clear, and exact description thereof, reference being had to the accompanying drawings, and to the letters of reference marked thereon.

My invention consists of a cylindrical riddle or screen, the lower portion of which is immersed in a vessel of water, through which riddle or screen and vessel flows a stream of water, in combination with an ordinary dredge-boat provided with a receptacle for receiving washed sand and elevators for removing the sand from said receptacle.

To enable others skilled in the art to make and use my invention, I will proceed to describe its construction and operation.

Figure 1:
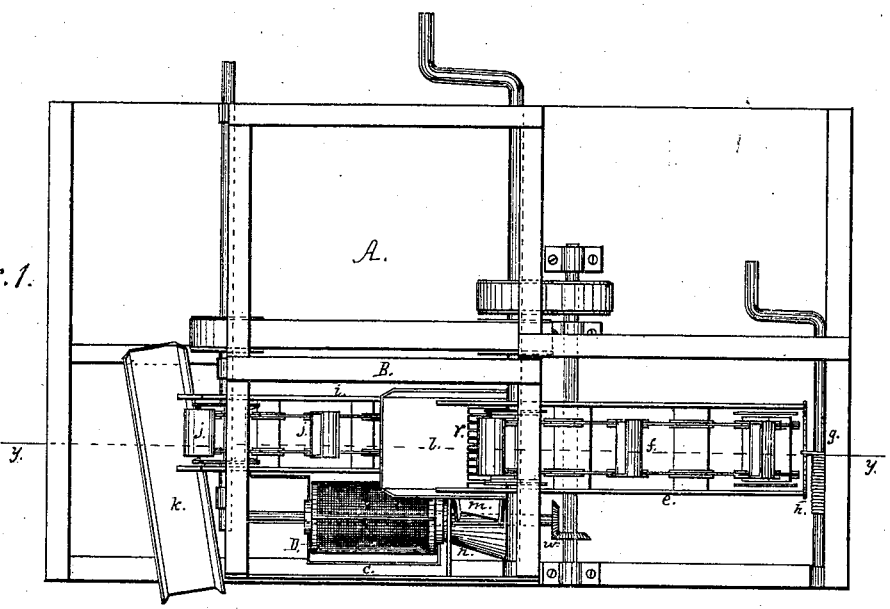
Figure 2:
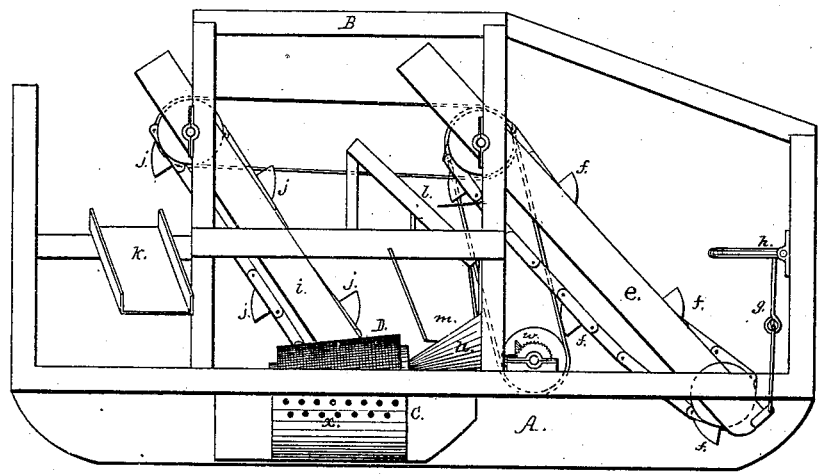
Figure 3:
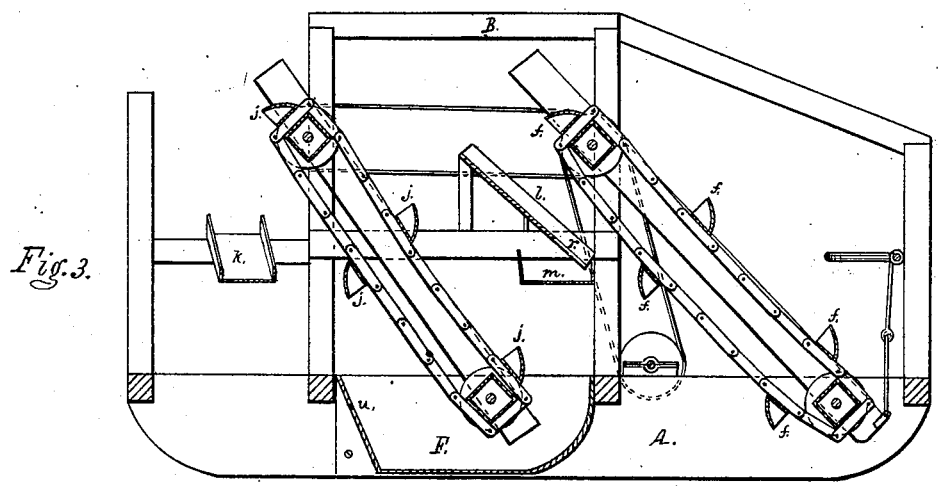
Figure 1:
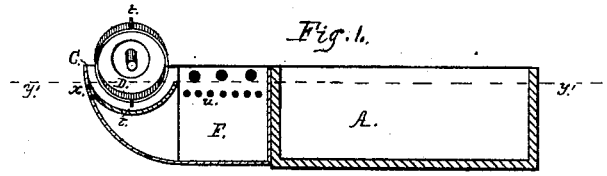

In the accompanying drawings, which form part of my specification, Figure 1 is a top view or plan of my improvement in sand-washing boat. Fig. 2 is a side elevation of the same. Fig. 3 is a vertical and longitudinal section of the same at line $y$ of Fig. 1. Fig. 4 is a transverse section of the screen, sand-receptacle, and hull of the boat.

In the drawings, A represents the hull of an ordinary dredge-boat, provided with suitable frame-work B for supporting the machinery and elevators. The dredge-boat is furnished with the ordinary elevators, mounted in a frame which is pivoted at its upper end, and at the lower end is a chain or rope, $g$, connected with a crank, $h$, for raising or lowering it for adapting the dredging apparatus to the depth of the stream in which the boat is operating.

The riddle or screen D is placed in a vessel, C, into which is constantly flowing, through openings $x$, currents of water, whereby the lower portion of the riddle D is always immersed in water and a current of water is constantly flowing through the riddle, thereby keeping the meshes of it clean.

On the outer wall of the riddle, running lengthwise of it, are wings $t\ t$ for sweeping the washed sand from the vessel C into the receptacle F, which is provided with openings $u$ for the outflow of water from the receptacle F.

The vessel C and receptacle F are sunk below the surface of the stream in which the boat is moving, as indicated by the dotted line $y'$.

To the frame-work B is pivoted an elevator-frame, $i$, having elevators $j$, the lower portion of the frame being susceptible of adjustment with relation to the bottom of the receptacle F. To the frame-work B is attached a number of chutes, $k\ l\ m\ n$, the office of which will hereinafter be explained.

The revolving riddle or screen is mounted upon a shaft, and is revolved by bevel-gearing, as indicated at $w$. The elevators are driven by suitable shafting, pulleys, and belts, the construction and arrangement of which will readily be understood by the skilled mechanic by reference to the accompanying drawings.

A flat inclined screen may be employed as a substitute for the revolving screen D, provided a reciprocating motion is imparted to said flat screen and it is immersed in water.

The operation of my improvement is as follows: The riddle D and elevators being put in motion by proper power and machinery, the sand, gravel, and other matter are elevated from the river or other place and deposited upon the chute $l$. The coarse matter, such as stones, lumps of coal, &c., separated by the separator $r$, (consisting of a series of small bars,) passes over into the river, and the sand passes down between the separator-bars and falls into the chute $m$, from which it passes into the chute $n$, and from it into the interior of the revolving screen, where it is thoroughly washed, the washed sand passing through the meshes of the screen D into the vessel C, from which it is discharged into the receptacle F by the wings $t$ of the screen D. The coarse matter and refuse are discharged from the lower end of the screen D into the river or other place. The washed sand is conveyed from the receptacle F by the elevators $j$, and deposited upon the chute $k$, from which it runs into a flat-boat or other receiver for transportation and use.

The riddle or screen D in its construction and operation is substantially the same as that described in Letters Patent granted David Furnier, No. 64,091, and dated April 23, 1867, as will more fully appear by reference to said Letters Patent.

Having thus described my improvement in sand-washing boats, what I claim as of my invention is—

1. A screen or riddle immersed in a vessel of water, and through which is flowing a stream of water, in combination with an ordinary dredging-boat for supplying the said screen with unwashed sand, substantially as herein described, and for the purpose set forth.

2. A cylindrical screen immersed in a vessel of water, through which screen and vessel flow a current or currents of water, in combination with an ordinary dredging-boat having elevators for supplying and charging into the interior of said screen unwashed sand, substantially as herein described, and for the purpose set forth.

3. The combination of a cylindrical screen immersed in a vessel of water, through which screen and vessel flows a current of water, a dredging-boat having elevators for supplying the interior of said screen with unwashed sand, a receptacle for receiving the sand after being washed, and elevators for conveying the washed sand from said receptacle, substantially as herein described, and for the purpose set forth.

4. The combination of the screen D, vessel C, receptacle F, elevators $f\ j$, and chutes $l$, $m$, $n$, and $k$, constructed, arranged, and operating substantially as herein described, and for the purpose set forth.

DAVID C. WILLIAMS.

Witnesses:
A. C. JOHNSTON,
J. J. JOHNSTON.